(12) United States Patent
Qi

(10) Patent No.: US 7,965,877 B2
(45) Date of Patent: Jun. 21, 2011

(54) FINGERPRINT SENSING DEVICE USING PULSE PROCESSING

(76) Inventor: Baohua Qi, Columbus, IN (US)

( * ) Notice: Subject to any disclaimer, the term of this patent is extended or adjusted under 35 U.S.C. 154(b) by 1159 days.

(21) Appl. No.: 11/584,165

(22) Filed: Oct. 20, 2006

(65) Prior Publication Data
US 2007/0092117 A1 Apr. 26, 2007

Related U.S. Application Data

(60) Provisional application No. 60/729,670, filed on Oct. 24, 2005.

(51) Int. Cl.
*G06K 9/20* (2006.01)
(52) U.S. Cl. .................................................. 382/124
(58) Field of Classification Search ........... 382/124–127
See application file for complete search history.

(56) References Cited

U.S. PATENT DOCUMENTS 4,283,676 A * 8/1981 Shaw ........................... 324/679
6,937,031 B2 * 8/2005 Yoshioka et al. ............. 324/662

* cited by examiner

*Primary Examiner* — Brian P Werner

(57) ABSTRACT

A fingerprint sensing device that measures the capacitance between an array of electrode plates and finger skin using pulse processing, in which pulse width rather than voltage level, is used for capacitance measurement and digital signal conversion. A pulse, the width of which is compared and adjusted with that of a reference pulse, is generated when voltage at sensing electrodes in discharging is compared with a reference voltage. The comparison results are then digitalized in a grade image sensor or output directly in a binary image sensor. The sensor can communicate with a CPU using serial communication, parallel communication, or memory map scheme. Since no A/D is used, there is no extra time and hardware cost for the conversion from analog signals to digital signals. Due to the pulse processing nature, the circuits can be configured insensitive to the change or fluctuation in voltage supply. This feature enables the sensing device work with a variety of voltages, and thus it can be better used in portable, battery powered or passive devices.

18 Claims, 7 Drawing Sheets

FINGERPRINT SENSING DEVICE USING PULSE PROCESSING

CROSS REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

FIELD OF THE INVENTION

This present application claims priority from U.S. provisional application No. 60/729,670 having the same tile as the present invention and filed on Oct. 24, 2005. This invention relates to an apparatus for fingerprint sensing, more particularly, to a capacitive fingerprint sensor using pulse-processing method.

BACKGROUND OF THE INVENTION

As a biometric technique, fingerprint based identification has been successfully used in numerous applications, such as access control for buildings, verification of personal identity for portable communication, computing and network interface devices, and forensics. An electronic fingerprint device generally includes a fingerprint-sensing device that acquires fingerprint from a finger surface, and a fingerprint recognition device, which is used to process the data obtained with the fingerprint-sensing device.

A variety of methods, including optical, capacitive, thermal, RF-imaging, and mechanical sensing, have been used for fingerprint sensors. Among these methods, capacitive fingerprint sensing becomes popular with the development of fingerprint IC (Integrated Circuit) sensors that integrates the sensing and signal processing circuits. Capacitive IC sensors measure the capacitance between an array of metal plates on a silicon surface and finger skin. Larger capacitance is obtained for the fingerprint ridges that are slightly closer than the valleys, and thus an image of the fingerprint can be generated by measuring the distribution of capacitance.

Normally, the sensing process for capacitive fingerprint sensors includes capacitance sensing and Analog to Digital (A/D) conversion. In capacitance sensing, an electrical level signal is generated for the capacitance of each sensing point, and then with an A/D converter the level signals are converted to digital signals which can be accessed by a CPU through a communication circuit. In this process, the capacitance sensing and the A/D conversion can be independent. The overall fingerprint sensing speed is limited by capacitance sensing speed, scanning frequency, communication bandwidth, and A/D conversion sampling rate. Normally it needs a few seconds to obtain a good fingerprint image.

In the present invention, a capacitive fingerprint sensing circuit is introduced. The sensing circuit converts the capacitance value of each sensing point directly into digital signals without using A/D devices. It is an object of the present invention to provide a simple, inexpensive, and fast capacitive fingerprint sensing means that is resistive to noises.

A second object of the present invention is to provide a fingerprint sensing device that is able to work with a variety of voltages, so that it can be better used in portable, battery powered or passive devices such as smart cards and RFIDs.

BRIEF SUMMARY OF THE INVENTION

The present invention provides an apparatus for detecting a fingerprint by measuring the capacitance between an array of electrode plates and finger skin. Different from other methods, in the present invention, pulse width rather than voltage level, is used for capacitance measurement and digital signal conversion. The sensing apparatus in the present invention comprises an array of detection electrodes and an insulating surface disposed over them. Capacitors are formed between the detection electrodes and finger skin surface. A capacitance conversion circuitry is used to change the capacitance sensing value into digital signals, and a control logic circuit is used to control the timing of capacitive conversion and scanning. The digital signals obtained in the sensing process can be sent to a computer through a data output control circuit.

In the present invention, both of grade sensing apparatuses that generate images containing gray level information, and binary sensing apparatuses gather binary images are included. According to an aspect of the present invention, the capacitance conversion circuitry for the binary sensing apparatus includes voltage comparison circuits discharging circuits, and pulse comparison circuits. According to another aspect of the present invention, the capacitance conversion circuitry for grade sensing apparatus includes voltage comparison circuits, discharging circuits, pulse comparison circuits, and digitalizers. No voltage level signals in the present invention are generated for capacitance detecting and thus no A/D converter is needed. Effects of the parasite capacitance are offset by pulse comparison.

Communication in the present invention includes serial communication, parallel communication, and memory map scheme. Since no A/D device is used, there is no extra time and hardware cost for the conversion from analog signals to digital signals. When a serial or parallel communication is used, the sensing time for the binary image sensors is determined by discharging time of sensing capacitors and the resolution of the sensors, while that for the grade image sensors is further limited by the resolution of digitalization. If the memory map scheme is employed, then the sensing time is irrelevant to the sensor resolution.

Since no voltage level signals are employed for comparison and reference, the circuits in the present invention can be configured insensitive to the change or fluctuation in voltage supply. This feature enables the sensing device work with a variety of voltages, and thus it can be better used in portable, battery powered or passive devices.

DETAILED DESCRIPTION OF THE INVENTION

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others. Detailed descriptions of known functions and constructions unnecessarily obscuring the subject matter of the present invention have been omitted for clarity.

Figure 1:
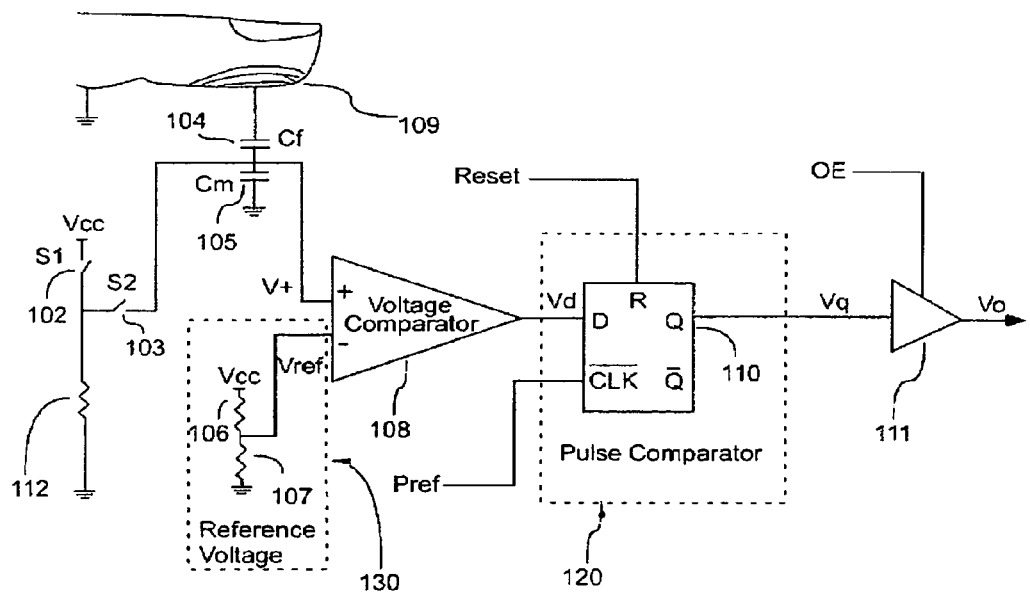
FIG. 1 is an equivalent circuit diagram showing a capacitance detecting apparatus that generates binary image output.

An equivalent circuit diagram of the present fingerprint sensors that generates binary images is shown in FIG. 1. A resistor 112 is connected to a voltage source Vcc through a switch S1 (102). A switch S2 (103) is used to connect the resistor 112 to the positive input of a voltage comparator 108, and the sensing capacitors comprising the parasite capacitor Cm (105) and finger capacitor Cf(104), which is formed by finger skin surface 109 and the sensing surface. A reference voltage Vref, which in the example shown in FIG. 1 is generated by a reference voltage generation circuit 130 including resistors 106 and 107, is applied to the negative input the voltage comparator 108. The output of the voltage comparator 108, Vd, is connected to a pulse comparator 120, which in this example includes a D-type flip-flop 110. A pulse Pref is used as a reference for the pulse comparison. The output voltage of the pulse comparator 110 is then connected to an output buffer 111, which can be enabled by a signal OE.

Figure 2:
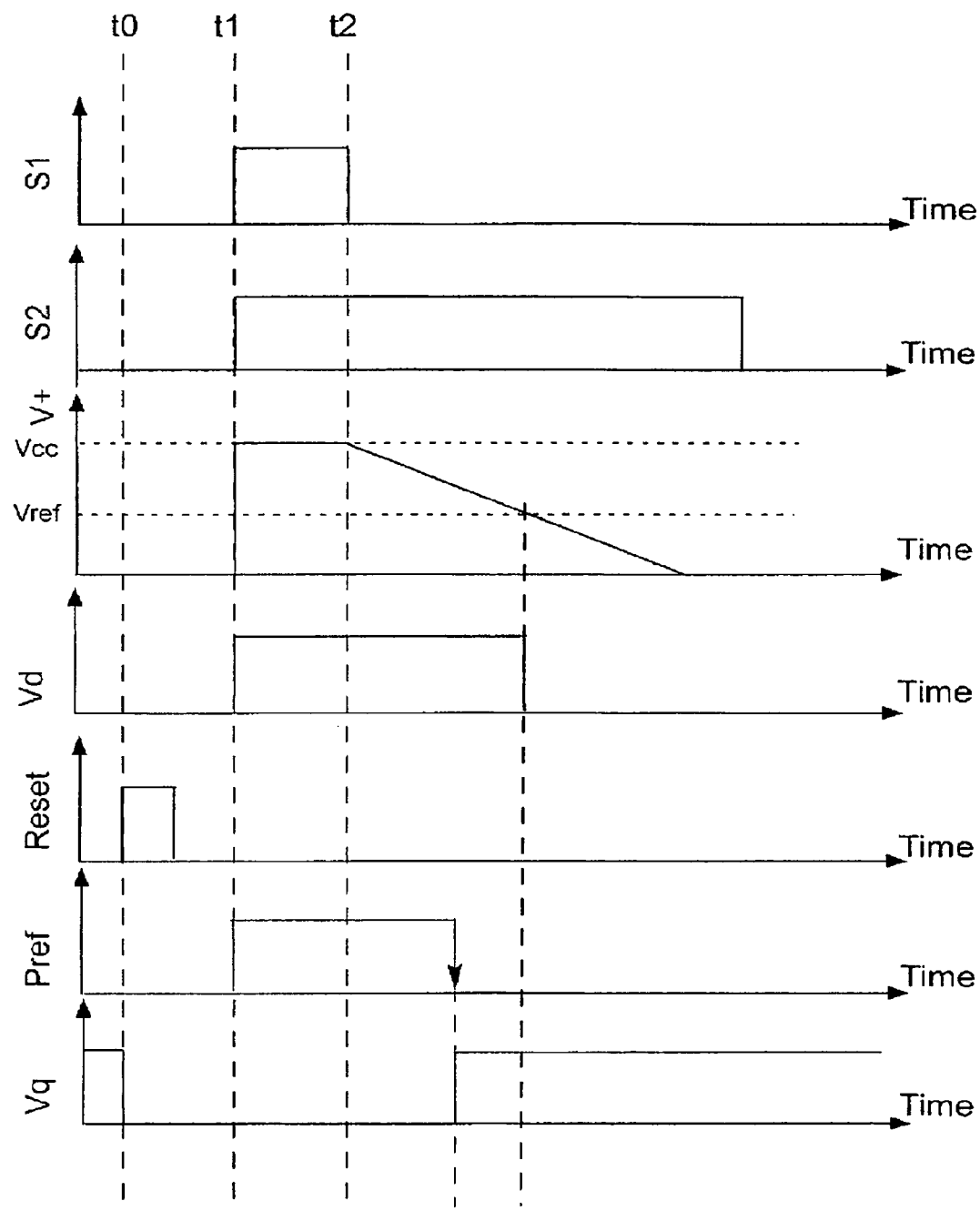
FIG. 2 illustrates timing charts for the operation of the binary capacitance detecting apparatus depicted in FIG. 1.

The time sequence charts for the circuit illustrated in FIG. 1 are shown in FIG. 2. At time t0, a pulse appears at the Reset line, and resets the D-type flip-flop 110. At time t1, switches S1 and S2 are on. The capacitors Cf and Cm are then charged by the voltage source Vcc. When the voltage at Cf and Cm is higher than the reference voltage Vref, which is set through the resistors 106 and 107, a high level voltage Vd appears at the output of the voltage comparator 108. At time t2, the switch S1 is off, and the capacitors Cf and Cm discharges through the resistor 112. When the voltage at Cf and Cm becomes lower than the reference voltage Vref, Vd transits to a low level voltage. At the D-type flip-flop 110, the pulse Vd is compared with a reference pulse Pref, which is synchronized by the control signal for the switch S1. If the width of the pulse Vd is longer than that of reference pulse Pref, i.e., the capacitance of Cf and Cm is higher than a threshold, which corresponds to ridge capacitance, then the Q output of the flip-flop 110 is locked to a high voltage level, otherwise, a low voltage level will be latched. The output signal of the flip-flop 110 then appears as the signal Vo when the output buffer 111 is enabled by a high level voltage at OE. In the pulse comparison circuit, the width of the reference pulse Pref can be adjusted to adapt to the capacitance base-line change. Based on that, a feedback scheme can be further used to improve the image quality by changing the pulse width of Pref according to the image evaluation result.

The circuit depicted in FIG. 1 is robust to the fluctuation in Vcc. The pulse width of Vd is the "on" time (the time when a high level voltage is applied on S1, i.e., t2–t1 in FIG. 2) of switch S1 plus the time t for the voltage on Cf and Cm changes from Vcc to Vref. In discharging, $$Vcc \cdot e^{-t/R_{112}(Cf+Cm)} = [Vcc - Vcc \cdot R_{106}/(R_{106}+R_{107})] \quad (1)$$

where $R_{112}$ is the resistance of the resistor 112; $R_{106}$ and $R_{107}$ are, respectively, the resistance of resistors 106 and 107. According to equation (1), $$t = -R_{112}(Cf+Cm)\ln[1-R_{106}/(R_{106}+R_{107})] \quad (2)$$

In equation (2), the time t is only determined by the resistance $R_{106}$, $R_{107}$, $R_{112}$, and capacitance Cf and Cm, and is not affected by the voltage Vcc. Since the digital circuits in the sensor are simple and insensitive to the supply voltage, e.g. CMOS circuits are able to work with a supply voltage of 3V to 18V, this feature makes it possible for the sensor to work at a variety of supply voltages or when a significant fluctuation exists in the voltage supply.

Figure 3:
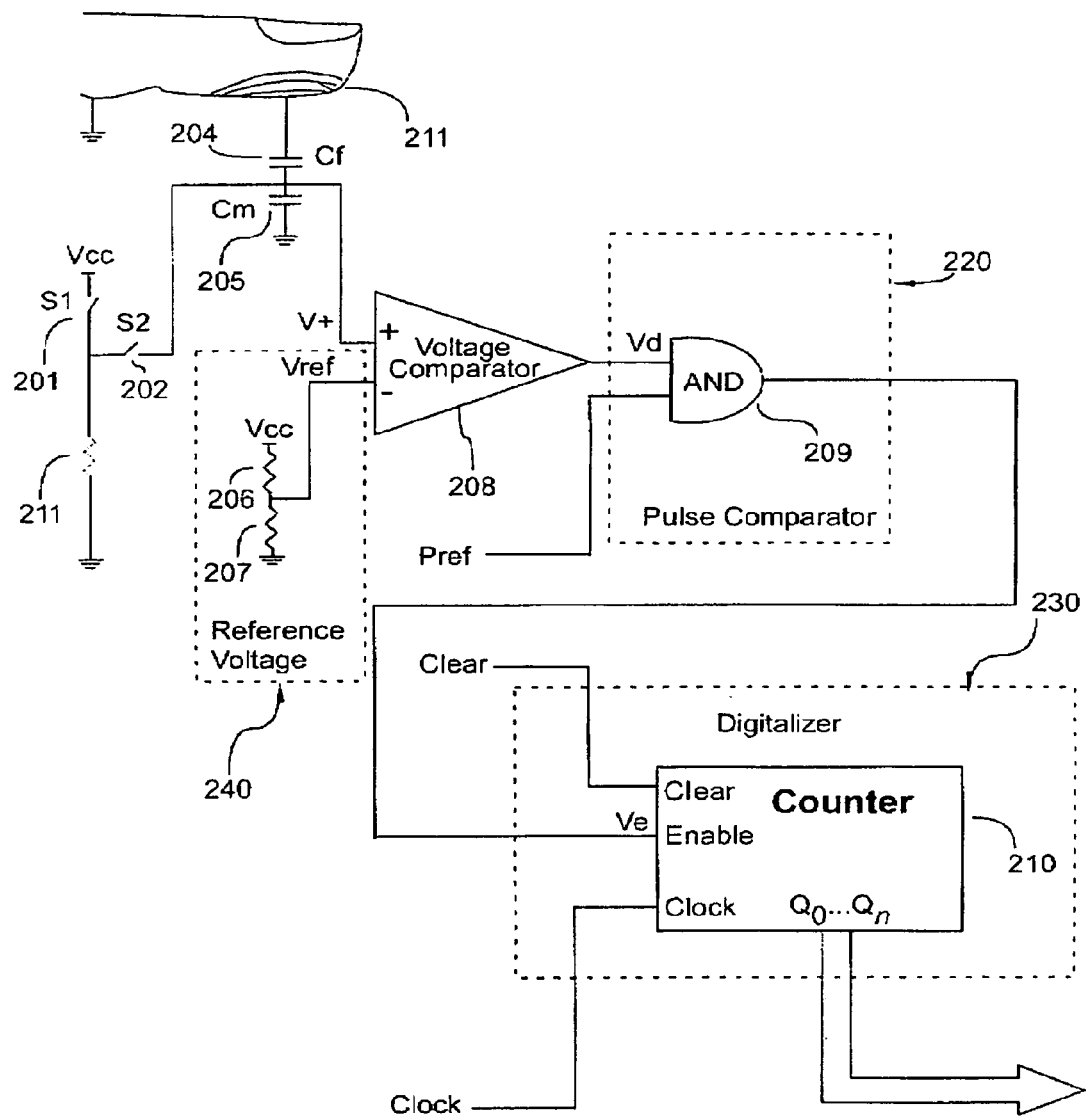
FIG. 3 is an equivalent circuit diagram showing a capacitance detecting apparatus that generates grade image output.

The equivalent circuit of a capacitive fingerprint sensing device generating grade images is depicted in FIG. 3. The device has a similar structure as that shown in FIG. 1 except that the pulse comparator uses an AND gate instead of a D-type flip flop and after pulse comparison, the grade image sensor uses a digitalization circuit to convert the pulse signals into digital signals. Referring to FIG. 3, the device includes a switch S1 (201) and a switch S2 (202) that are used to provide a voltage Vcc to fingerprint capacitance Cf (204) and parasite capacitance Cm (205), and drain off the charge on Cf and Cm through a resistor 211. At a voltage comparator 208, the voltage on capacitors Cf and Cm, V+, is compared with a reference voltage Vref, which in the example depicted in FIG. 3 is generated by a reference voltage generation circuit 240 comprising a resistor 206 and a resistor 207. The comparison result Vd is then compared with a reference pulse Pref in a pulse comparator 202, which in the example shown in FIG. 3 is an AND gate 209. The adjusted pulse Ve output from the AND gate 209 is then sent to a digitalizer 230, which in the example shown in FIG. 3 is a counter 210. Herein the pulse Ve enables the counter 210, the output values of which are a function of capacitance Cf.

Figure 4:
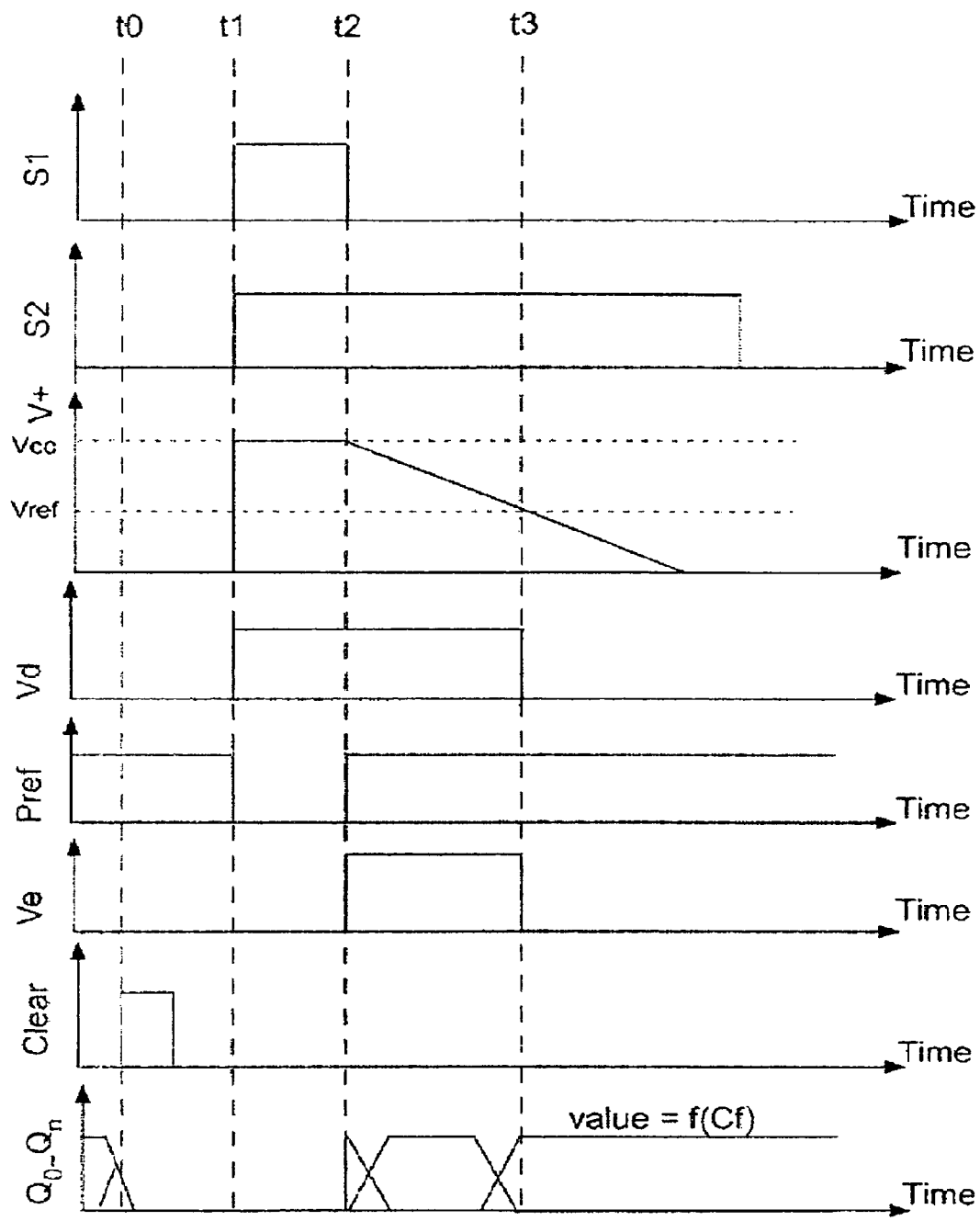
FIG. 4 illustrates timing charts for the operation of the grade capacitance detecting apparatus depicted in FIG. 3.

FIG. 4 shows the time charts of the circuit in FIG. 3. At time t0, a pulse appears at the Clear line, and clears the counter 210. At time t1, switches S1 and S2 are on. The capacitors Cf and Cm are charged by the voltage source Vcc. When the voltage at Cf and Cm is higher than the reference voltage Vref, which is set through the resistors 206 and 207, a high level voltage Vd appears at the output of the voltage comparator 208. At time t2, the switch S1 is off, and then the capacitors Cf and Cm discharges through the resistor 211. When the voltage at Cf and Cm becomes lower than Vref, Vd transits to a low level voltage. At the AND gate 209, the pulse Vd is then compared with a reference pulse Pref, which is synchronized by the control signal for the switch S1. The adjusted pulse Ve enables the counter 210 till time t3, and the counting value then is the pulse width of Ve, which is determined by the capacitance of Cf through a function f(Cf) according to equation (2). Resolution of the pulse width measurement is controlled by the frequency of the Clock for the counter 210.

As illustrated in FIG. 4, different from that in FIG. 1, the reference pulse Pref in FIG. 3 is used to deduct from the pulse with of Ve the "on" time (t2–t1 in FIG. 4) of switch S1, the pulse width caused by parasite capacitance, and pulse width due to time delay of the devices. Normally, the reference pulse in grade image sensors is shorter than that in binary image sensors.

A fingerprint image is generated by scanning a capacitor array that formed by the finger skin surface and the sensing electrodes, and the data can be transferred serially, in parallel, or even stored in the sensor mapped as a memory. Since no A/D is used, there is no extra time and hardware cost for the conversion from analog signals to digital signals. The sensing time for the binary image sensor is determined by the discharging time, while that for the grade image sensor is further limited by the resolution of digitalization, which is set by the frequency of the counter clock.

Figure 5:
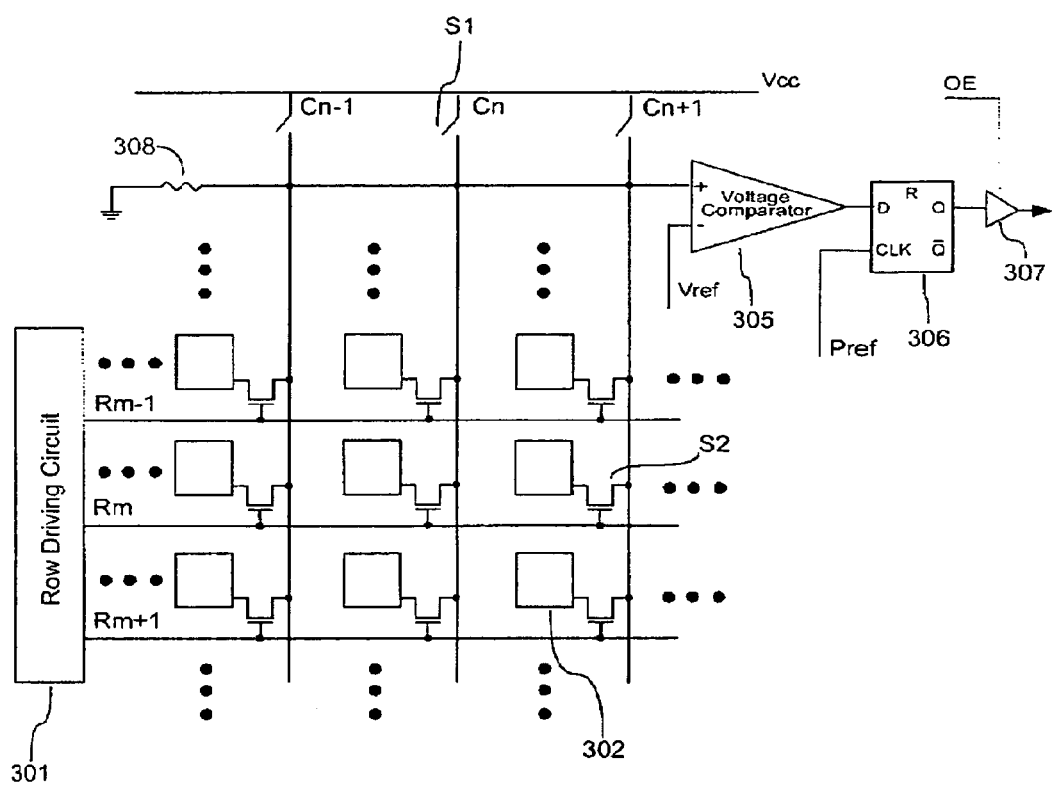
FIG. 5 is a block diagram showing an example of the fingerprint detecting apparatus that uses serial communication.

Referring to FIG. 5, a serial scanning sensor, which has the minimum hardware cost and longest sensing time among all other sensors in the present invention, includes only one capacitance conversion circuit (FIG. 5 only shows the binary conversion circuit as illustrated in FIG. 1. The same structure can be used for grade conversion circuit as depicted in FIG. 3). A row driving circuit 301 is used to provide control signals for the row capacitors in the array. Switches S1 and S2 serially control the charging and discharging for each capacitor 302 through a resistor 308. The voltage at capacitors is compared with a reference voltage Vref in a voltage comparator 305, and the result pulse is compared with a reference pulse Pref in a D-type flip flop 306. The data output is controlled through a buffer 307. In this circuit, for example, when the row Rm is selected by applying a high voltage level on switches S2, all capacitors in row Rm are connected to the input of the voltage comparator 305 through S2. Serially opening and closing the switch S1 for columns, such as Cn−1, Cn and Cn+1, the capacitors at the cross of row Rm and the columns are charged and discharged individually, and the capacitance is then measured for each capacitor. The sensing time for this circuit is $m \cdot n \cdot t_c$, where m, n are, respectively, the number of rows and columns of the capacitor array; $t_c$ is the capacitance conversion time including the charging and discharging time. For example, for a 256×200 capacitor array, if $t_c$ is 1 µs, then the sensing time is 51.2 ms. Communication can be in parallel with sensing when a pipeline control circuit is used, thereby the overall data acquisition time is reduced.

Figure 6:
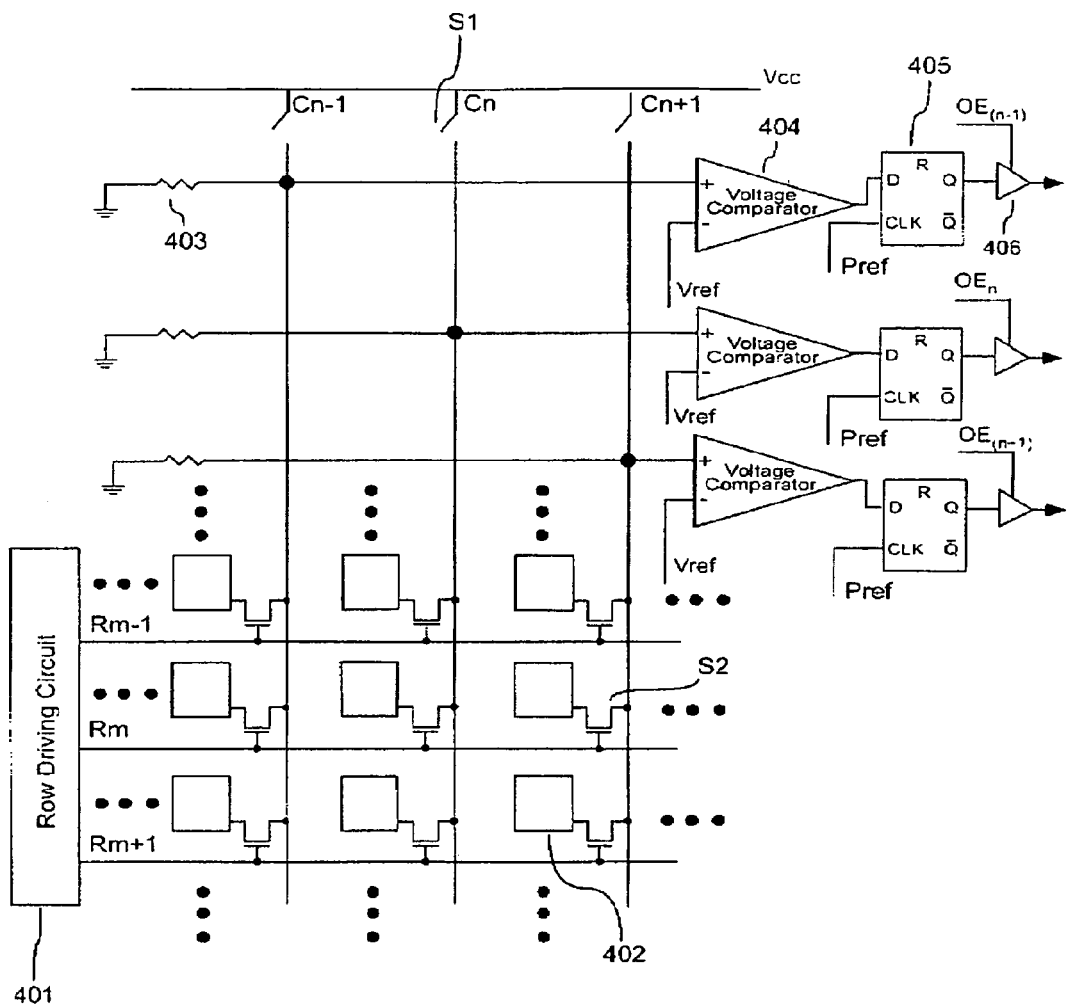
FIG. 6 is a block diagram showing an example of the fingerprint detecting apparatus that uses parallel communication.

To decrease the sensing time, a parallel sensing circuit as shown in FIG. 6 can be used. As that illustrated in FIG. 5, FIG. 6 only shows the binary conversion circuit. The same structure can be used for grade conversion circuit. In FIG. 6, multiple capacitance conversion circuits rather than just one circuit as depicted in FIG. 5 are employed. A row driving circuit 401 is used to provide control signals to the row capacitors in the array. Switches S1 and S2 serially control the charging and discharging for each capacitor 402 through resistors 403. The voltage at capacitors then is compared with a reference voltage Vref in voltage comparators 404, and the result pulses are compared with a reference pulse Pref in D-type flip flops 405. Data output is controlled through buffers 406. In this circuit, for example, when the row Rm is selected by applying a high voltage level on switches S2, the capacitors in row Rm are connected to voltage comparators 404. Opening and closing the switches S1 for columns, such as Cn−1, Cn and Cn+1, the capacitors at the cross of row Rm and the columns are charged and discharged simultaneously and the capacitance is measured for all these capacitors at the same time. The sensing time for this circuit is $m \cdot n \cdot t_c/k$, where m, n are, respectively, the number of rows and columns of the capacitor array; $t_c$ is the capacitance conversion time, and k is the number of capacitance conversion circuits used in the sensor. For example, for a 256×200 capacitor array, if $t_c$ is 1 µs, and k is 32, then the overall sensing time is 1.6 ms. The overall data acquisition time can be reduced by using a pipeline control circuit, which allows capacitance conversion during communication.

Figure 7:
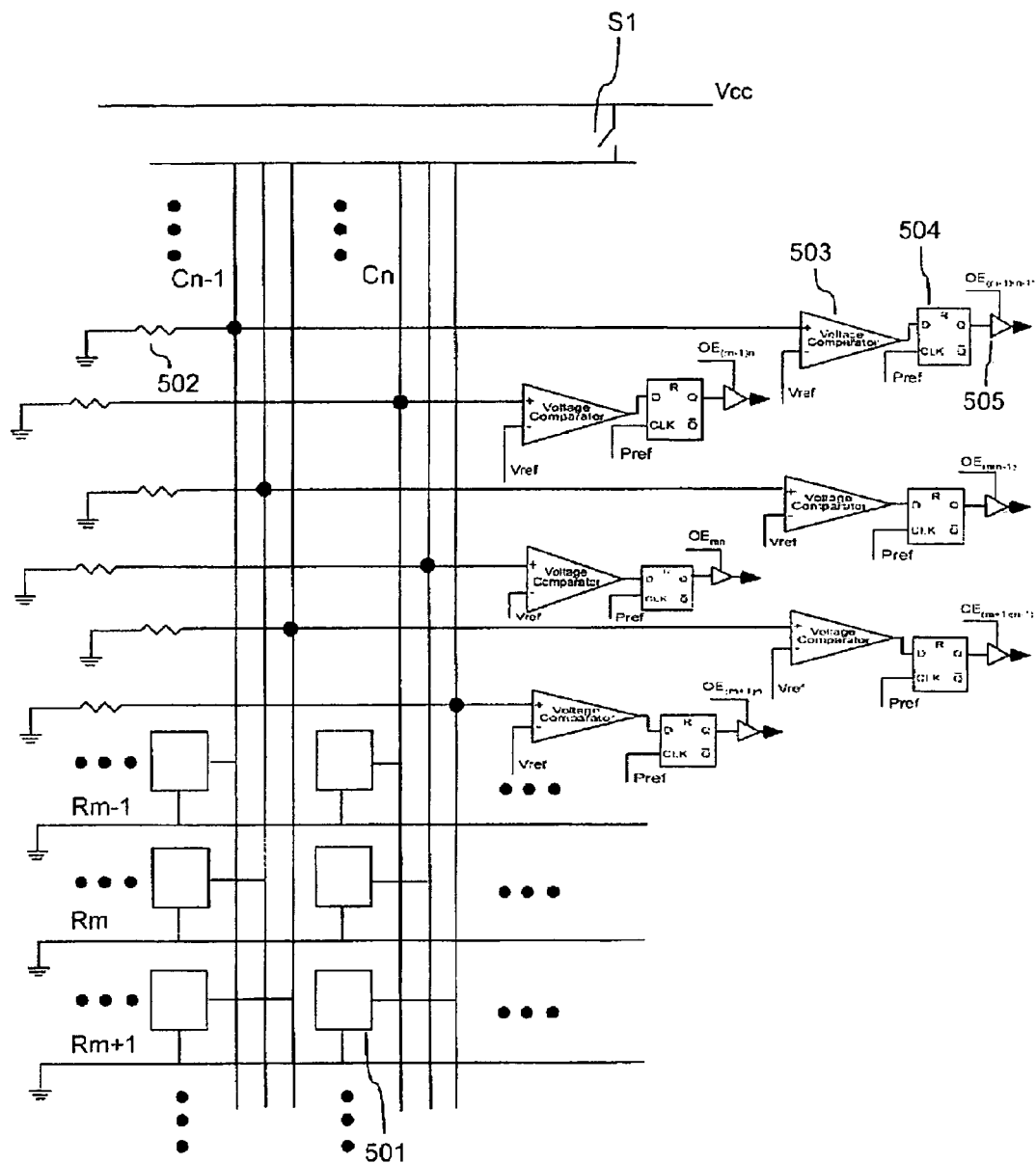
FIG. 7 is a block diagram showing an example of the fingerprint detecting apparatus that uses memory map scheme.

The sensing time can be further decreased if more capacitance conversion circuits are used, and a memory map scheme can be employed to decrease the communication cost. In the memory-mapped circuit, as that in a memory cell, each output of the capacitance conversion circuits is accessed through an address associated with it. A sensing circuit for memory map scheme is shown in FIG. 7. As that depicted in FIG. 5 and FIG. 6, FIG. 7 only shows the binary conversion circuit for clarity. The same structure can be used for grade conversion circuit. In FIG. 7, each capacitor in the array, e.g., 501, has its individual capacitance conversion circuits. No scanning control circuit is used. The voltage Vcc is provided for all capacitors through a switch S1, which controls the charging and discharging for each capacitor through resistors 502. The voltage at capacitors then is compared with a reference voltage Vref in voltage comparators 503, and the result pulse is compared with a reference pulse Pref in D-type flip-flops 504. Through buffers 505, sensing data output is controlled by OE signals, which are provided by an address logic circuit (Not shown in FIG. 7). In this memory-mapped circuit, the sensing process for the capacitor array can be finished in just one charging-discharging cycle: when switch S1 is closed and opened, all capacitors in the array are charged and discharged, and then the capacitance is measured at the same time. The overall sensing time for this circuit is $t_c$, which is independent of the sensor resolution. Since the device is mapped as a data memory for the CPU, no communication is needed.

The invention claimed is:

1. A capacitance detection apparatus for detecting fingerprints, comprising:
    an array of sense electrodes which form capacitors with the finger surface;
    capacitance conversion elements which include discharging circuits, voltage comparison circuits, and pulse width comparison circuits which output a first voltage level corresponding to a fingerprint ridge capacitance, and otherwise output a second voltage level;
    control logic circuits and switching elements for controlling the charging and discharging of said capacitors, voltage comparison, and pulse comparison; and
    data output control circuits.

2. The apparatus according to claim 1, wherein the voltage comparison circuits include reference voltage generation circuits having a voltage divider comprising two resistors.

3. The apparatus according to claim 2, wherein said discharging circuit includes a resistor, so that the discharging time to a reference voltage is insensitive to the voltage supply.

4. The apparatus according to claim 1, wherein said pulse width comparison circuits have the input of reference pulse, the width of which can be used as a threshold to separate the fingerprint ridge capacitance from background.

5. The apparatus according to claim 1, wherein said pulse width comparison circuits include a pulse comparator wherein the width of pulses generated by said voltage comparison circuits is compared with that of a reference pulse.

6. The apparatus of claim 5, wherein said pulse comparator latches the pulses generated by said voltage comparison circuits with the edge of said reference pulse.

7. The apparatus according to claim 1, wherein said data output control circuit includes a communication circuit and uses a pipe-line control logic to control the communication and capacitance conversion, so that capacitance conversion can be performed simultaneously with communication.

8. The apparatus according to claim 1, wherein said data output control circuit uses a memory map scheme, so that each output of said capacitance conversion elements can be accessed through an address associated with it.

9. A capacitance detection apparatus for detecting fingerprints, comprising:
- an array of sense electrodes which form capacitors with the finger surface;
- capacitance conversion elements which include discharging circuits, voltage comparison circuits, pulse width comparison circuits which generate voltage pulses with pulse width determined by a fingerprint capacitance formed between finger surface and the sense electrodes, and digitization circuits which directly digitize the pulse widths output from the pulse width comparison circuits;
- control logic circuits and switching elements for controlling the charging and discharging of said capacitors, voltage comparison, and pulse comparison; and data output control circuits.

10. The apparatus according to claim 9, wherein the voltage comparison circuits include reference voltage generation circuits having a voltage divider comprising two resistors.

11. The apparatus according to claim 10, wherein said discharging circuit includes a resistor, so that the discharging time to a reference voltage is insensitive to the voltage supply.

12. The apparatus according to claim 9, wherein said pulse width comparison circuits have the input of reference pulse, the width of which can be used as a threshold to separate the fingerprint capacitance from background.

13. The apparatus according to claim 9, wherein said pulse width comparison circuits include a pulse comparator wherein the width of pulses generated by said voltage comparison circuits is compared with that of a reference pulse.

14. The apparatus of claim 13, wherein said pulse comparator deducts the width of said reference pulse from that of the pulses generated by said voltage comparison circuits.

15. The apparatus according to claim 9, wherein said digitization circuits include a digitizer which is used to convert the width of the pulse adjusted by said pulse comparison circuits into digital signals.

16. The apparatus of claim 15, wherein said digitizer includes a counter.

17. The apparatus according to claim 9, wherein said data output control circuit includes a communication circuit and uses a pipe-line control logic to control the communication and capacitance conversion, so that capacitance conversion can be performed simultaneously with communication.

18. The apparatus according to claim 9, wherein said data output control circuit uses a memory map scheme, so that each output of said capacitance conversion elements can be accessed through an address associated with it.

* * * * *